United States Patent
Martin et al.

(10) Patent No.: US 11,115,216 B2
(45) Date of Patent: Sep. 7, 2021

(54) PERTURBATION-BASED ORDER PRESERVING PSEUDONYMIZATION OF DATA

(71) Applicant: EntIT Software LLC, Sunnyvale, CA (US)

(72) Inventors: Luther Martin, Sunnyvale, CA (US); Timothy Roake, Sunnyvale, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 205 days.

(21) Appl. No.: 15/926,460

(22) Filed: Mar. 20, 2018

(65) Prior Publication Data

US 2019/0296914 A1 Sep. 26, 2019

(51) Int. Cl.
*H04L 9/32* (2006.01)
*G09C 1/00* (2006.01)
*H04L 29/06* (2006.01)

(52) U.S. Cl.
CPC .............. *H04L 9/3236* (2013.01); *G09C 1/00* (2013.01); *H04L 63/0428* (2013.01); *H04L 2209/42* (2013.01)

(58) Field of Classification Search
CPC .............. H04L 2209/42; H04L 9/0631; G06F 21/6254; G06F 21/602
USPC .......................................................... 726/26
See application file for complete search history.

(56) References Cited

U.S. PATENT DOCUMENTS

| | | | |
|---|---|---|---|
| 2009/0193249 A1 | 7/2009 | Conrado et al. | |
| 2009/0265788 A1 | 10/2009 | Ehrenschwender et al. | |
| 2010/0017603 A1* | 1/2010 | Jones | H04L 9/0844 713/168 |
| 2012/0121080 A1* | 5/2012 | Kerschbaum | H04L 9/0643 380/28 |
| 2015/0128282 A1* | 5/2015 | Zhang | H04L 9/3268 726/26 |
| 2015/0134969 A1* | 5/2015 | Kim | H04L 9/3242 713/176 |
| 2015/0254474 A1* | 9/2015 | Nelke | G06F 21/6254 726/26 |
| 2016/0021109 A1* | 1/2016 | Jueneman | G06F 21/72 713/165 |
| 2017/0177683 A1* | 6/2017 | Koike | G06F 7/026 |

FOREIGN PATENT DOCUMENTS

EP 2124166 A1 11/2009

OTHER PUBLICATIONS

Campero, Alejandro N.; "Balancing Utility and Privacy of High-Dimensional Archives Datasets: Mobile Phone Metadata"; Submitted to Massachusestts Institute of Technology, Sep. 2015; 76 pages.

(Continued)

*Primary Examiner* — Teshome Hailu

(57) ABSTRACT

A technique includes converting a plurality of plaintext values to a corresponding plurality of pseudonym values. The conversion includes performing encryption of the plurality of plaintext values to provide a plurality of second values; perturbing the plurality of second values to provide the plurality of pseudonym values; and controlling the perturbing to cause an ordering of the plaintext values to be represented in the plurality of pseudonym values.

20 Claims, 5 Drawing Sheets

(56) References Cited

OTHER PUBLICATIONS

Jabeen, Farhana; IEEEAccess; "Enhanced Architecture for Privacy Preserving Data Integration in a Medical Research Environment"; Publication May 31, 2017; Date of Current Version Jul. 31, 2017; 19 pages.

Hintze, Mike; "Meeting Upcoming GDPR Requirements While Maximizing the Full Value of Data Analytics/Balancing the Interests of Regulators, Data Controllers and Data Subjects"; White Paper; Co-Founder at Anonos; Jan. 2017; 24 pages.

Imperva; "Pseudonymization"; Compliance 101; Data Security & Compliance Center; https://www.imperva.com/data-security/; 2017; 6 pages.

Information Age; "Why Companies Need Pseudonymisation and Data Masking for GDPR Compliance"; www.information-age.com/why-companies-need-pseudonymisation-and-data-masking-gdpr-compliance-123461628/ Nov. 21, 2017; 9 pages.

* cited by examiner

PERTURBATION-BASED ORDER PRESERVING PSEUDONYMIZATION OF DATA

BACKGROUND

A business organization (a retail business, a professional corporation, a financial institution, and so forth) may collect, process and/or store data that represents sensitive or confidential information about individuals or business organizations. For example, the data may be personal data that may represent names, residence addresses, medical information, salaries, banking information, and so forth. The data may be initially collected or acquired in "plaintext form," and as such may be referred to as "plaintext data." Plaintext data refers to ordinarily readable data. As examples, plaintext data may be a sequence of character codes, which represent the residence address of an individual in a particular language; or the plaintext data may be a number that conveys, for example, a blood pressure reading.

DETAILED DESCRIPTION

Figure 1:
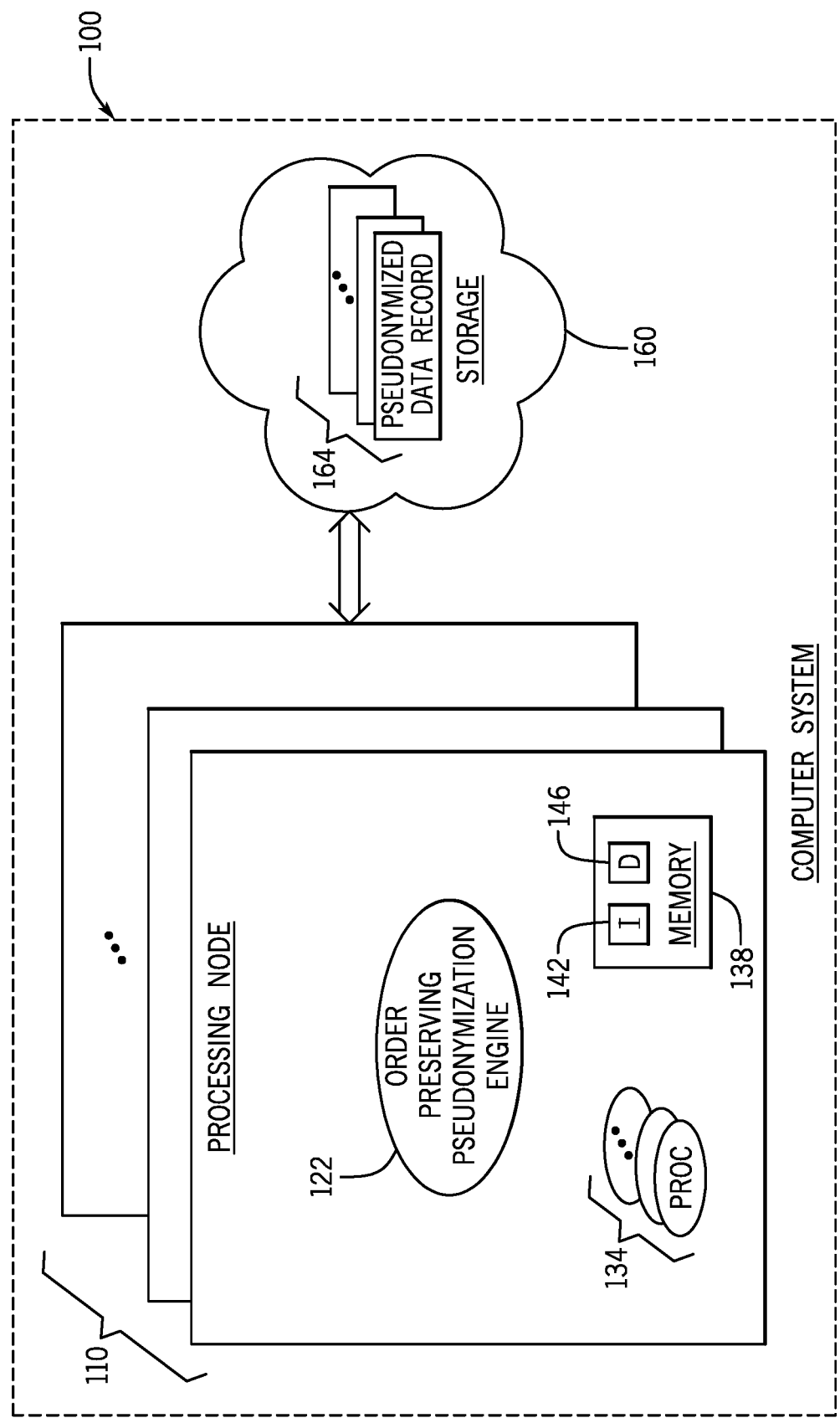
FIG. 1 is a schematic diagram of a computer system according to an example implementation.

For purposes of controlling access to sensitive information (e.g., information relating to confidential or sensitive information about one or more business enterprises and/or individuals) plaintext data items, which represent the sensitive information, may be converted, through a process called "pseudonymization," into corresponding pseudonymns, or pseudonym values. In this context, a "plaintext data item" (also referred to as "plaintext," or a "plaintext value" herein) refers to a unit of data (a string, an integer, a real number, and so forth) that represents ordinarily readable content. As examples, a plaintext data item may be a string of character codes, which correspond to data that represents a number that conveys, in a particular number representation (an Arabic representation, for example), a blood pressure measurement, a salary, and so forth. A pseudonym value ideally conveys no information about the entity associated with the corresponding plaintext value. The pseudonymization process may or may not be reversible, in that reversible pseudonymization processes allow plaintext values to be recovered from pseudonym values, whereas irreversible pseudonymization processes do not.

One way to convert a first dataset representing a collection of plaintext values into a corresponding second dataset representing a corresponding collection of pseudonym values is to apply an encryption cipher to the first dataset. The resulting ciphertext values may be used as the pseudonym values. However, the encryption may alter, if not entirely obfuscate, properties of the plaintext values. For example, the collection of plaintext values may have an associated order, such as a chronological order. More specifically, plaintext values may represent dates, such that a date that is represented by one plaintext value may occur before a date that is associated with another plaintext value. If the encryption removes or distorts the ordering, then the encryption may impair certain order related processing operations on the pseudonym value, such as operations that involve searching, sorting, and so forth.

One way to preserve the ordering of a collection of plaintext values so that the ordering is reflected in the corresponding collection of pseudonym values is to use order preserving encryption (OPE) to generate the pseudonym values. In other words, an OPE cipher may be applied to the plaintext values to produce ciphertext values, which may be used as the pseudonym values. With OPE, if plaintext values "a" and "b" are ordered such that a<b, then the ciphertext value "E(a)" is less than the ciphertext value "E(b)," i.e., E(a)<E(b). However, a potential challenge with using OPE to pseudonymize data is that the resulting ordering of the ciphertext space may convey enough information to allow the encryption to be reversed, such that plaintext value a, for example, may be obtained from its encrypted counterpart E(a).

In accordance with example implementations that are described herein, plaintext values may be pseudonymized using a process that preserves the ordering of the plaintext data in the pseudonymized data, while at the same time significantly inhibits, if not prevents, the pseudonymization process from being reversed. More specifically, in accordance with example implementations, OPE is employed to encrypt plaintext values to produce corresponding ciphertext values, and the ciphertext values are then perturbed (to produce the pseudonym values), for purposes of making the pseudonymization process irreversible. Moreover, in accordance with example implementations, the perturbing of the ciphertext values may be controlled in a manner that preserves the ordering of the plaintext values so that this ordering is reflected in the corresponding pseudonym values.

In this context, "perturbing" a value refers to altering, or changing, the value by a certain amount, called a "perturbation," or "perturbation value," In accordance with some implementations, the perturbation is less than the value that is altered, or perturbed, and in accordance with some implementations, the perturbation may be significantly less than the value that is perturbed. Depending on the particular implementation, perturbing a value may involve determining the corresponding perturbation using a deterministic process or a non-deterministic process. For example, in accordance with some implementations, the perturbation may be generated in a non-deterministic manner by randomly or pseudorandomly generating the perturbation.

In accordance with further example implementations, the perturbation may be generated in a deterministic manner as a function of the value being perturbed. In accordance with example implementations, a hash function (a cryptographic hash function and/or an order perturbing hash function, as examples) may be applied to the value being perturbed to generate the perturbation.

Referring to FIG. 1, as a more specific example, in accordance with some implementations, a computer system 100 may include one or multiple order preserving pseudonymization engines 122 (also called "pseudonymization engines 122" herein). In general, the computer system 100 may be a desktop computer, a server, a client, a tablet computer, a portable computer, a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

Regardless of its particular form, in accordance with some implementations, the computer system 100 may include one or multiple processing nodes 110; and each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processing nodes 110 may be coupled to a storage 160 of the computer system 100 through network fabric (not depicted in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the storage 160 may be located at the same geographical location or may be located at multiple geographical locations. Regardless of its particular form, the storage 160 may store pseudonymized data records 164, i.e., data records in which certain plaintext data items have been replaced with pseudonyms.

In accordance with some implementations, a given processing node 110 may contain a pseudonymization engine 122, which is constructed to, for a given plaintext value, apply an OPE cipher to the plaintext value (using an encryption key preserved in secrecy) to produce a corresponding ciphertext value. The order preserving pseudonymization engine 122 may then, in accordance with example implementations, perturb the ciphertext value, either in a non-deterministic or deterministic manner (depending on the particular implementation), to generate a pseudonym value for the given plaintext value. In accordance with example implementations, the pseudonymization process applied by the pseudonymization engine 122, as described herein, may be irreversible, i.e., it may not be possible to recover the plaintext values from the corresponding set of pseudonym values.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing plaintext values, pseudonym values, hash function outputs, randomly generated values, pseudorandomly generated values, perturbation values, ciphertext, intermediate results pertaining to the pseudonymization process, and so forth). The memory 138 may store instructions 142 that, when executed by one or multiple processors 134, cause the processor(s) 134 to form one or multiple components of the processing node 110, such as, for example, the pseudonymization engine 122.

In accordance with some implementations, the pseudonymization engine 122 may be implemented at least in part by a hardware circuit that does not include a processor executing machine executable instructions. In this regard, in accordance with some implementations, the pseudonymization engine 122 may be formed in whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

Figure 2:
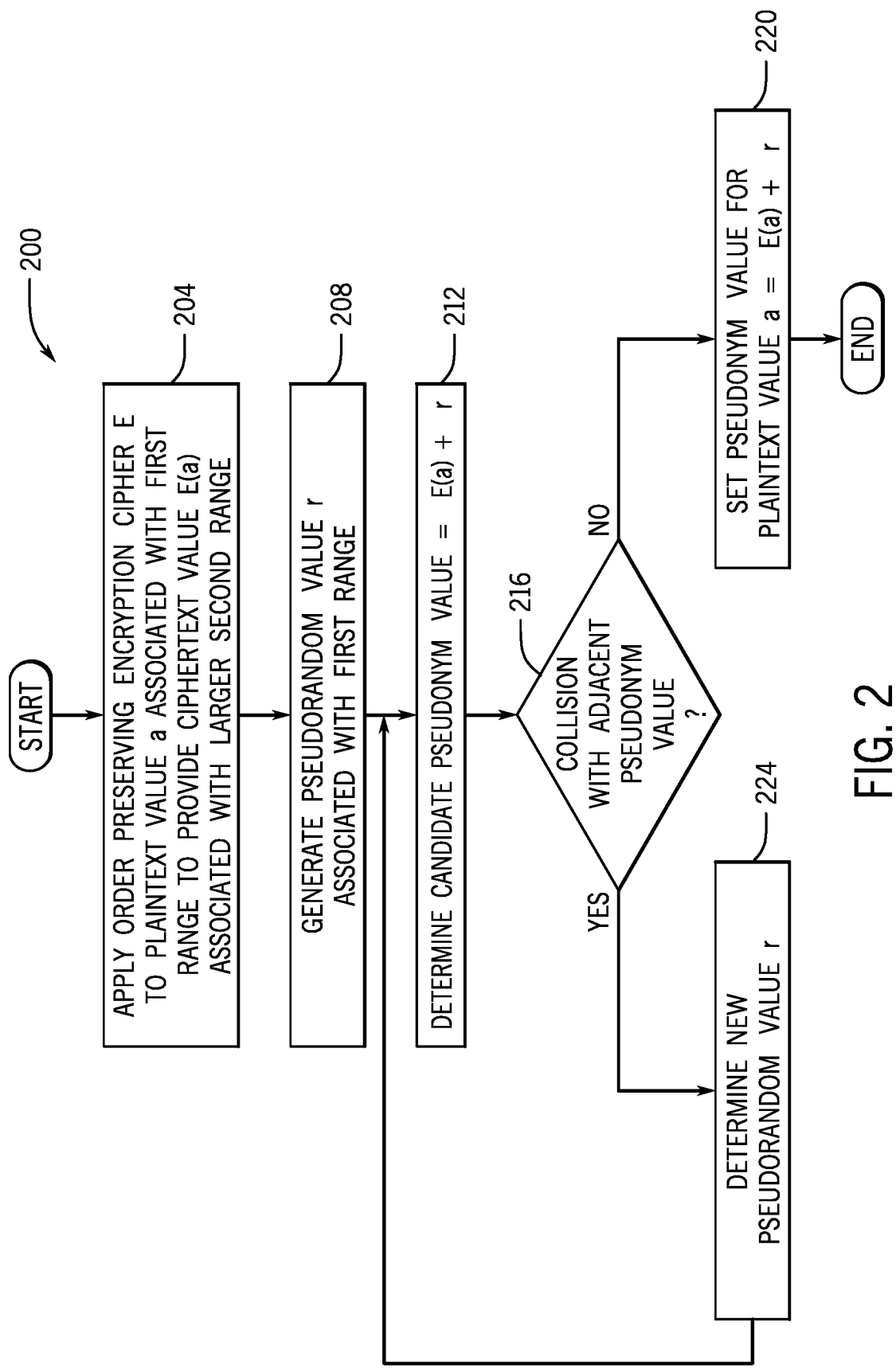
FIG. 2 is a flow diagram depicting a technique to perturb a ciphertext value using a randomly or pseudorandomly generated value to generate a pseudonym value according to an example implementation.

FIG. 2 depicts a technique 200 that may be performed by the order preserving pseudonymization engine 122 to convert a plaintext value to a pseudonym value in accordance with example implementations. Referring to FIG. 2 in conjunction with FIG. 1, the technique 200 includes applying (block 204) an order preserving encryption cipher E to a plaintext value "a" to provide a ciphertext value "E(a)." Pursuant to block 208, the technique 200 includes generating a pseudorandom value "r," i.e., a perturbation, or perturbation value, to be added to the ciphertext E(a). The added perturbation value r, in turn, inhibits, if not prevents, the plaintext value a from being recovered from the pseudonym value E(a)+r.

As depicted in block 204, the plaintext value a may be associated with a first range, and the corresponding ciphertext value E(a) may be associated with a second range that is larger than the first range. In this manner, in accordance with example implementations, the domain and range of the plaintext value a may be significantly smaller than the domain and the range of the ciphertext value E(a). For example, in accordance with some implementations, the plaintext value a may be represented by eight bits, whereas the ciphertext value E(a) may be represented by a significantly larger number of bits, such as, for example, 16 bits, 256 bits, and so forth. The perturbation value r, in turn, may have a range that is commensurate with the range of the plaintext value a, i.e., the perturbation value r may be represented, for example, by eight bits. Due to the significant difference between the plaintext and ciphertext ranges, adding the relatively small perturbation value r to the ciphertext E(a) can be expected to, in general, not collide with the next ordered pseudonym value in the ciphertext space.

In this context, an "order disrupting collision" (also called a "collision" herein) refers to the condition in which a given pseudonym value "PV(a)" is the same or greater than a pseudonym value "PV(b)," when a<b. In accordance with example implementations, an assumption may be made that although some order disrupting collisions may occur, these collisions may be relatively infrequent due to the disparity between the range of the plaintext and ciphertext spaces; and accordingly, in accordance with example implementations, generating the pseudonym values may not include detecting or correcting for such collisions.

In accordance with some implementations, however, the technique 200 includes checking for collisions and regenerating the perturbation value r in the case that a collision (due to the perturbation value r being added) is detected. In this regard, in accordance with some implementations, the technique 200 includes determining (block 212) a candidate pseudonym value of E(a)+r and then determining (decision block 216) whether a collision occurs between the candidate value and an adjacent larger pseudonym value. If not, then, pursuant to block 220, the pseudonym value is set equal to the candidate pseudonym value, i.e., the pseudonym value for the plaintext a is equal to E(a)+r. However, if, pursuant to decision block 216, a collision is detected, then, pursuant to block 224, the technique 200 determines a new pseudorandom value r, and control returns to block 212. It is noted that in the generation of some pseudonym values, blocks 212, 216 and 224 may be performed in multiple iterations, until a perturbation value r is determined, which does not produce a collision.

Thus, in accordance with example implementations, the pseudonymization engine 122 may generate a plurality of candidate pseudorandom values; and filter the plurality of candidate pseudorandom values to provide pseudorandom values that are added to ciphertext values to provide the pseudonym values. The filtering refers to applying a criteria to select certain candidate pseudonym values (such as selecting the candidate pseudonym values that do not cause order disrupting collisions, for example) that, when added to ciphertext values, preserve an ordering of the plaintext values in the pseudonym values.

In accordance with example implementations, the perturbation value r may be a pseudorandomly generated number. In accordance with further example implementations, the perturbation value r may be a randomly generated number. In accordance with example implementations, a "pseudo-random number" may be a nearly random number, and in accordance with example implementations, the order preserving pseudonymization engine 122 may include a pseudorandom number generator, such as a seed-based generator, which provides a pseudorandom number at its output.

As a more specific example, in accordance with example implementations, the order preserving pseudonymization engine 122 may include a polynomial-based generator, which provides an output that represents a pseudorandom number, and the pseudorandom number is based on a seed value that serves as an input to a polynomial function. As examples, the seed value may be derived from a state or condition at the time the pseudorandom number is to be generated, such as input provided by real time clock (RTC) value, a counter value, a measured noise value, a register value, and so forth. The polynomial-based generator receives the seed value as an input, applies a polynomial function to the seed value and provides an output (digital data, for example) that represents the pseudorandom number.

In accordance with further example implementations, the order preserving pseudonymization engine 122 may include a true random number generator, which provides an output that represents a truly random number for the perturbation value. For example, the random number generator may include an analog-to-digital converter (ADC) that provides a random digital output; and the ADC may sample a truly random analog signal, such as a thermal noise signal (a Johnson-Nyquist noise signal that is provided by a resistor, for example) or an atmospheric noise signal that is received by an antenna.

In accordance with further example implementations, the order preserving pseudonymization engine 122 deterministically generates the perturbation value that is added to the ciphertext value. More specifically, in accordance with some implementations, the order preserving the pseudonymization engine 122 may use a hash function (a cryptographic hash function, or a non-cryptographic hash function, as examples) to generate a perturbation value to be applied to the ciphertext produced by the OPE. In accordance with some implementations, the order preserving pseudonymization engine 122 may apply a hash function to the plaintext value, which produces a perturbation value that is constrained to a relatively smaller range than the range of ciphertext. For example, in accordance with some implementations, the order preserving pseudonymization engine 122 may apply a hash function to the plaintext value to produce an eight bit hash value, whereas the ciphertext space may correspond to a much larger space, such as a space of 16 to 256 bits. Similar to the generation of the non-deterministic pseudorandom or random perturbation values, the order preserving pseudonymization engine 122 may or may not perform collision detecting/correction, in accordance with example implementations.

In accordance with some implementations, the order preserving encryption engine 122 may apply an order preserving hash function, i.e., the output of the hash function increases with the corresponding plaintext values. Accordingly, no collision detection/correction may be performed, as the perturbation values are generated in a manner, which avoids order disrupting collisions.

Figure 3:
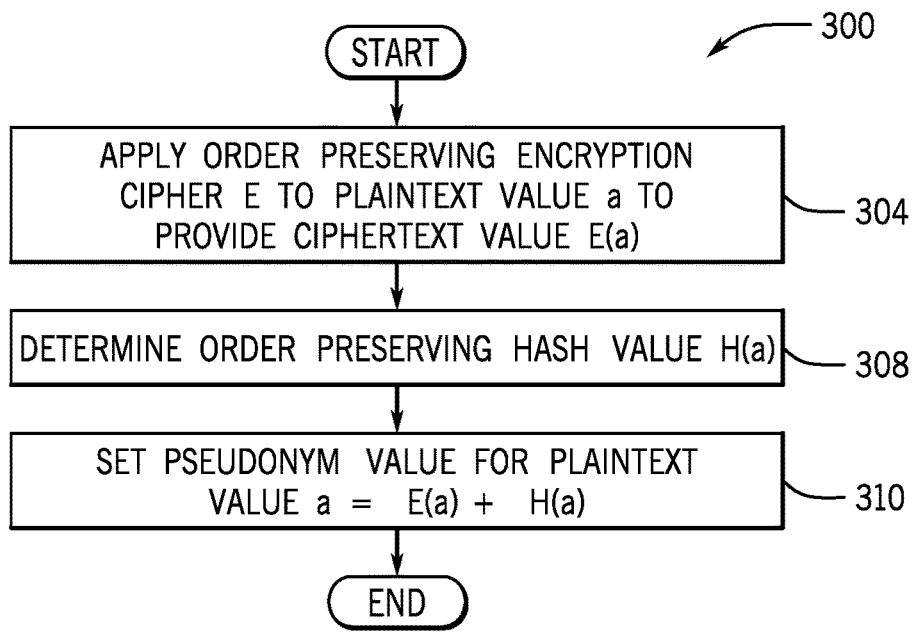
FIG. 3 is a flow diagram depicting a technique to perturb a ciphertext value using a hash function to generate a pseudonym value according to an example implementation.

More specifically, in accordance with example implementations, the order preserving pseudonymization engine 122 may perform a technique 300 that is depicted in FIG. 3. Referring to FIG. 3 in conjunction with FIG. 1, pursuant to the technique 300, the order preserving pseudonymization engine 122 applies (block 304) an order preserving encryption cipher E to a plaintext value a to produce a ciphertext value E(a) and determines (block 308) an order preserving hash value H(a). The order preserving pseudonymization engine 122 then sets, pursuant to block 310, the corresponding pseudonym value equal to E(a)+H(a).

Figure 4:
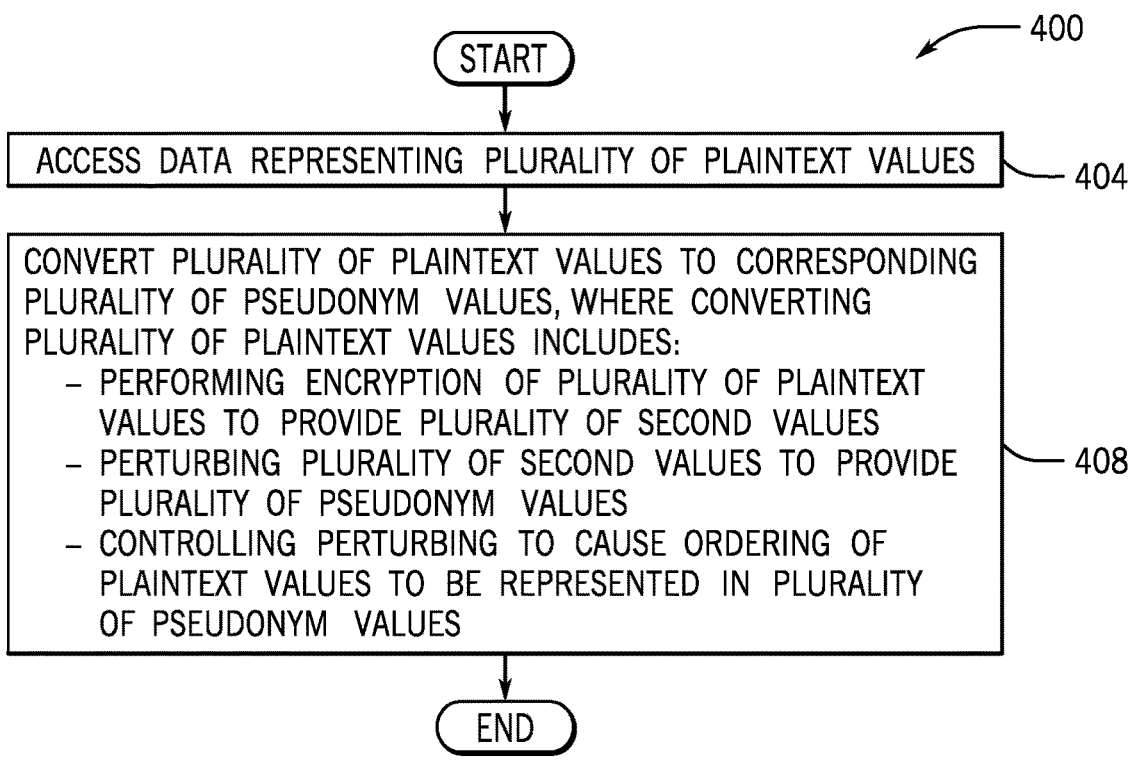
FIG. 4 is a flow diagram depicting a technique to perform perturbation-based order preserving pseudonymization of data according to an example implementation.

Thus, referring to FIG. 4, in accordance with example implementations, a technique 400 includes accessing (block 404) data, which represents a plurality of plaintext values and converting (block 408) the plurality of plaintext values to a corresponding plurality of pseudonym values. Converting the plurality of plaintext values includes performing encryption of the plurality of plaintext values to provide a plurality of second values; perturbing the plurality of second values to provide the plurality of pseudonym values; and controlling the perturbing to cause an ordering of the plaintext values to be represented in the plurality of pseudonym values.

Figure 5:
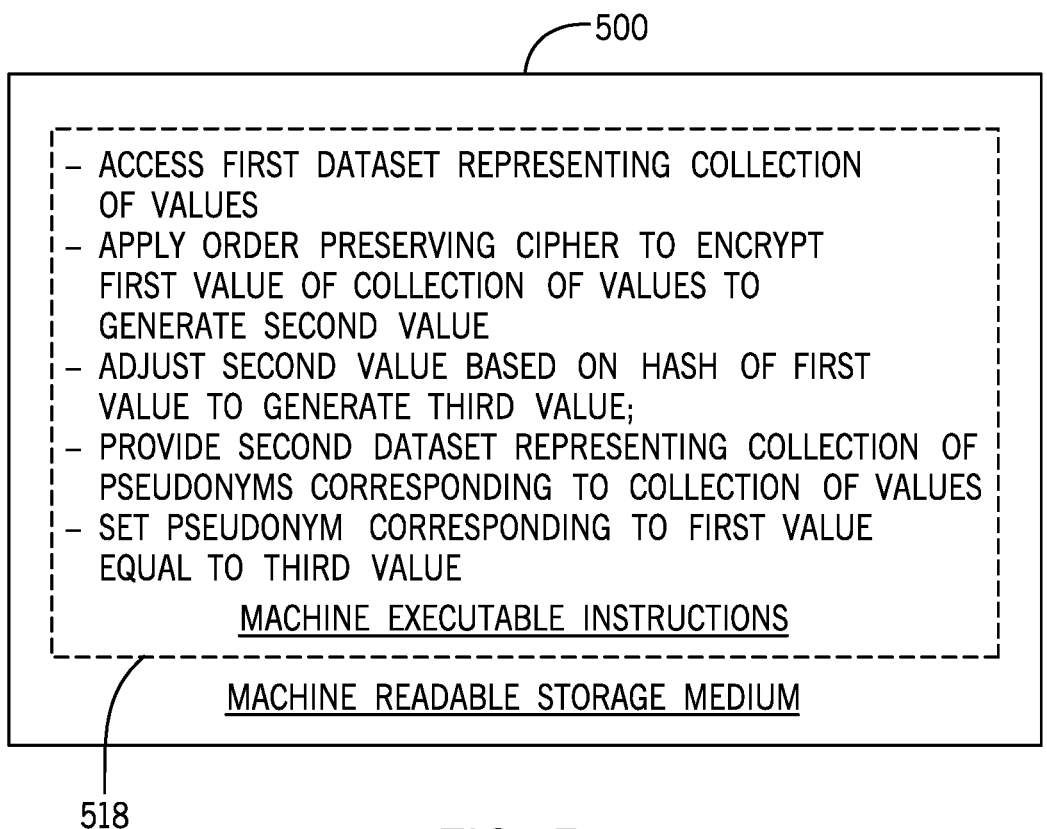
FIG. 5 is an illustration of machine executable instructions stored on a non-transitory machine readable storage medium to provide a dataset representing a collection of pseudonyms according to an example implementation.

Referring to FIG. 5, in accordance with example implementations, a non-transitory machine readable storage medium 500 stores instructions 518 that, when executed by a machine, cause the machine to access a first dataset representing a collection of values; and apply an order preserving cipher to encrypt a first value of the collection of values to generate a second value. The instructions, when executed by the machine, cause the machine to adjust the second value based on a hash of the first value to generate a third value; provide a dataset, which represents a collection of pseudonyms corresponding to the collection of values; and set the pseudonym corresponding to the first value equal to the third value.

Figure 6:
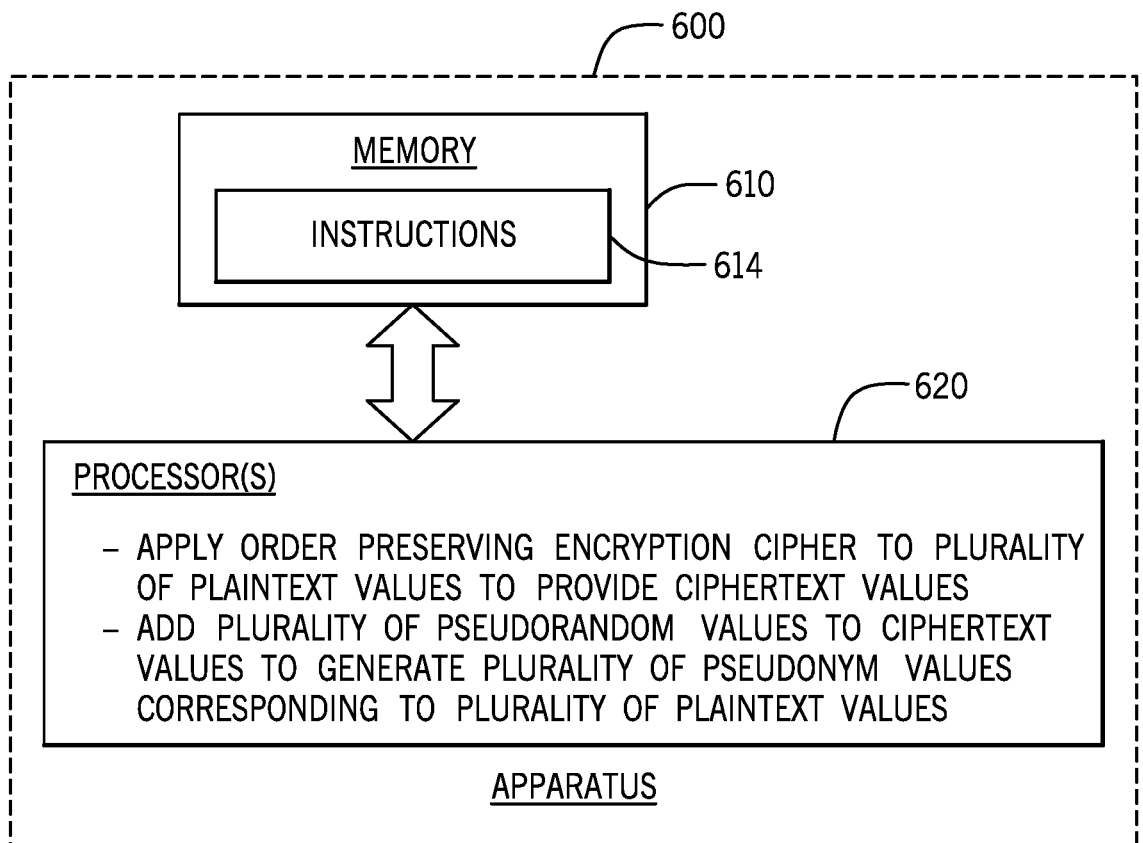
FIG. 6 is a schematic diagram of an apparatus to generate pseudonym values according to an example implementation.

Referring to FIG. 6, in accordance with example implementations, an apparatus 600 includes at least one processor 620 and a memory 610 to store instructions 614 that, when executed by the processor(s) 620, cause the processor(s) 620 to apply an order preserving encryption cipher to a plurality of plaintext values to provide ciphertext values. The instructions, when executed by the processor(s) 620, cause the processor(s) 620 to add a plurality of pseudorandom values to the ciphertext values to generate a plurality of pseudonym values, which correspond to the plurality of plaintext values.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   accessing data representing a plurality of plaintext values; and
   converting, by a processor of a computing device, the plurality of plaintext values to a plurality of pseudonym values, wherein the converting comprises:
      performing an encryption of the plurality of plaintext values to provide a plurality of ciphertext values;
      perturbing each ciphertext value of the plurality of ciphertext values to provide a pseudonym value of the plurality of pseudonym values, wherein the perturbing of each ciphertext value of the plurality of ciphertext values comprises: generating a perturbation value of a plurality of perturbation values to be added to the ciphertext value of the plurality of ciphertext values, wherein the perturbation value is smaller than the ciphertext value to which the perturbation value is to be added, and adding the perturbation value to the ciphertext value to generate the pseudonym value; and
      controlling the perturbing of each ciphertext value of the plurality of ciphertext values to cause an ordering of the plurality of plaintext values to be represented in the plurality of pseudonym values, wherein the controlling comprises, for each ciphertext value, determining whether to perform another iteration of adding the perturbation value to the ciphertext value based on the pseudonym value.

2. The method of claim 1, wherein the perturbation value is pseudorandomly or randomly generated.

3. The method of claim 1, wherein the controlling further comprises constraining the perturbation value to be within a first range smaller than a second range of a given pseudonym value of the plurality of pseudonym values.

4. The method of claim 1, wherein the controlling comprises:
   for a given ciphertext value of the plurality of ciphertext values, determining whether a given pseudonym value of the plurality of pseudonym values collides with any other pseudonym value of the plurality of pseudonym values; and
   accepting the given pseudonym value as a pseudonym value to represent a corresponding plaintext value in response to the given pseudonym value not colliding with any other pseudonym value of the plurality of pseudonym values.

5. The method of claim 4, further comprising, in response to the given pseudonym value colliding with another pseudonym value of the plurality of pseudonym values:
   generating another perturbation value to be added to the ciphertext value, and
   adding the another perturbation value to the ciphertext value to generate another pseudonym value to represent the ciphertext value.

6. The method of claim 1, wherein generating the perturbation value to be added to the ciphertext value comprises applying a hash function to the ciphertext value to provide a hash value.

7. The method of claim 6, wherein the hash value is used as the perturbation value to be added to the ciphertext value to generate the pseudonym value.

8. The method of claim 6, wherein the hash function is an order preserving hash function in which an output of the hash function increases correspondingly with the plurality of plaintext values.

9. The method of claim 6, wherein the hash function is a cryptographic hash function.

10. The method of claim 1, wherein performing the encryption of the plurality of plaintext values comprises performing an order preserving encryption.

11. The method of claim 1, wherein controlling the perturbing of each ciphertext value comprises preserving an ordering in the plurality of pseudonym values.

12. The method of claim 1, wherein the perturbing of the plurality of ciphertext values to provide the plurality of pseudonym values inhibits the plurality of plaintext values from being recovered from the plurality of pseudonym values.

13. An apparatus comprising:
    at least one processor; and
    a memory to store instructions that, when executed by the at least one processor, cause the at least one processor to:
       encrypt a plurality of plaintext values to provide a plurality of ciphertext values, wherein the plurality of plaintext values has an associated ordering;
       perturb each ciphertext value of the plurality of ciphertext values, including causing the at least one processor to:
          generate a perturbation value of a plurality of perturbation values to be added to a ciphertext value of the plurality of ciphertext values, the perturbation value is smaller than the ciphertext value to which the perturbation value is to be added, and
          add the perturbation value of the plurality of perturbation values to the ciphertext value of the plurality of ciphertext values to provide a pseudonym value of a plurality of pseudonym values; and
       control the perturbing of each ciphertext value of the plurality of ciphertext values to cause an ordering of the plurality of plaintext values to be represented in the plurality of pseudonym values, including causing the at least one processor to, for each ciphertext value, determine whether to perform another iteration of adding the perturbation value to the ciphertext value based on the pseudonym value.

14. The apparatus of claim 13, wherein, to control the perturbing of each ciphertext value, the instructions, when executed by the at least one processor, cause the at least one processor to:
    determine whether the pseudonym value is in conflict with an adjacent pseudonym value in the plurality of pseudonym values, in response to the pseudonym value is not in conflict with the adjacent pseudonym value, utilize the pseudonym value as an encrypted value of the plaintext value from which the pseudonym value is derived, and in response to the pseudonym value is in conflict with the adjacent pseudonym value, generate another perturbation value to be added to the ciphertext value.

15. The apparatus of claim 13, wherein the instructions cause the at least one processor to perturb each ciphertext value of the plurality of ciphertext values to inhibit the plurality of plaintext values from to be recovered from the plurality of pseudonym values.

16. The apparatus of claim 13, wherein a given ciphertext value of the plurality of ciphertext values has an associated first bit size, and a given pseudonym value of the plurality of pseudonym values has an associated second bit size less than the first bit size.

17. A non-transitory machine readable storage medium storing instructions that, when executed by a machine, cause the machine to:

access a first dataset representing a first collection of plaintext values;

encrypt the plaintext values to generate ciphertext values;

perturb each ciphertext value of the ciphertext values to provide a pseudonym value of a plurality of pseudonym values, including causing the machine to:

generate a perturbation value to be added to the ciphertext value, wherein the perturbation value is smaller than the ciphertext value to which the perturbation value is to be added, and add the perturbation value to the ciphertext value to generate the pseudonym value; and control the perturbing of each ciphertext value of the ciphertext values to cause an ordering of the of plaintext values in the first collection to be represented in the plurality of pseudonym values, including causing the machine to, for each ciphertext value, determine whether to perform another iteration of adding the perturbation value to the ciphertext value based on the pseudonym value.

18. The non-transitory machine readable storage medium of claim 17, wherein the instructions, when executed by the machine, further cause the machine to apply an order preserving hash function to each plaintext value to generate each perturbation value.

19. The non-transitory machine readable storage medium of claim 17, wherein the instructions, when executed by the machine, further cause the machine to apply a cryptographic hash function to each plaintext value to generate each perturbation value.

20. The non-transitory machine readable storage medium of claim 17, wherein the instructions, when executed by the machine, further cause the machine to:

constrain the perturbation value to be within a first range smaller than a second range of the ciphertext value.

* * * * *